United States Patent [19]

Lau

[11] Patent Number: 5,184,679
[45] Date of Patent: Feb. 9, 1993

[54] GRAVEL PACKING PROCESS

[75] Inventor: Hon C. Lau, Houston, Tex.

[73] Assignee: Shell Oil Company, Houston, Tex.

[21] Appl. No.: 800,175

[22] Filed: Nov. 27, 1991

[51] Int. Cl.$^5$ .............................................. E21B 43/04
[52] U.S. Cl. .................................. 166/278; 166/246; 166/300; 252/8.551
[58] Field of Search ............... 166/246, 276, 278, 300; 252/8.551

[56] References Cited

U.S. PATENT DOCUMENTS

| | | | |
|---|---|---|---|
| 4,662,447 | 5/1987 | Bolin | 166/278 |
| 4,754,809 | 7/1988 | van Zanten et al. | 166/246 |
| 4,900,457 | 2/1990 | Clarke-Sturman et al. | 252/8.551 X |
| 5,054,552 | 10/1991 | Hall et al. | 166/278 |

FOREIGN PATENT DOCUMENTS 0040445 11/1981 European Pat. Off. .

OTHER PUBLICATIONS

"Succinoglycan," Oil Field Chemistry, A. J. Clarke-Sturman et al, 1989 American Chemical Society, pp. 158–168.

"Symposium on Advances in Oil Field Chemistry" presented before the Division of Petroleum Chemistry Inc., American Chemical Society Toronto Meeting Jun. 5–11, 1988, pp. 25–29.

"Influence of Anions on the Properties of Microbial Polysaccharides in Solution," International Journal of Biological Macromolecules, vol. 8, No. 6, Dec. 1986, pp. 355–360.

SPE 23109, "Development and Field Testing of a Novel Fracturing Fluid", D. R. Davies et al, pp. 105–116 (Sep. 1991).

SPE 22798, "The Use of Succinoglycan Biopolymer for Gravel Packing", G. P. Sanz et al, pp. 413–423 (Oct. 1991).

*Primary Examiner*—George A. Suchfield
*Attorney, Agent, or Firm*—Del S. Christensen

[57] ABSTRACT

An improved gravel packing process is provided in which a gravel pack slurry is thickened with succinoglycan and the slurry further comprises an amount of breaker effective to result in 80 percent settlement of sand from the slurry after a time period larger than about one hour and shorter than about three hours.

17 Claims, No Drawings

GRAVEL PACKING PROCESS

FIELD OF THE INVENTION

This invention relates to an improved gravel pack process to gravel pack a wellbore.

BACKGROUND TO THE INVENTION

When oil is produced from unconsolidated formations, migration into the wellbore of loose sand and erosion from sandstone is a constant problem. This migration of sand may eventually clog flow passages in the production system of the well and can erode downhole and surface equipment. In some instances, the clogging of the production system may lead to complete cessation of flow, or "killing" of the well.

Sand migration is typically controlled by placement of a gravel pack around a slotted or screened production liner. The "gravel" used in such a gravel pack is actually a sand of a size which is large enough to be kept out of the production liner or screen, but small enough to prevent migration of formation sand past the gravel pack and into the production facilities.

A gravel pack is generally placed by first inserting the slotted or screened liner in the portion of the wellbore to be packed. A "crossover" tool is positioned on top of the liner. The crossover tool and liner are suspended from a drill pipe. The crossover tool allows a slurry of sand in a fluid carrier to be pumped down a drill string to the crossover tool, and then be routed through the crossover tool to the volume surrounding the slotted or screened liner. The sand is deposited within this volume and the perforations. In a circulating gravel pack, some of the liquid carrier of the gravel pack slurry enters the slotted or screened liner where it can communicate through on to the annulus surrounding the drill string. The rest of the fluid leaks out to the formation through the perforations. A packer is placed above the liner in the annulus surrounding the crossover tool to prevent the slurry around the liner from bypassing the liner and communicating directly to the annulus around the drill pipe. After the sand is deposited around the liner and in the perforations, the crossover tool is disconnected from the liner and lifted out of the wellbore. A production tubing is then lowered into the wellbore and connected to the liner.

The gravel pack slurry must be sufficiently viscous to suspend the sand, and must be sufficiently shear-thinning to be pumpable. This viscosity characteristic is often provided by a polysaccharide. Further, after the sand is placed in the wellbore around the liner, it would be desirable to have the sand settle from the slurry suspension as quickly as possible. Lifting of the crossover tool from the liner before the slurry settles into a dense sand bed can disturb the gravel pack. Therefore, the gravel pack tool is typically left stationary for several hours after the gravel is placed. This has been found to be necessary with prior art gravel pack slurries, but is very expensive due to the cost of the rig time required.

It would be preferable to have a gravel pack slurry which would rapidly become less viscous after being placed in the wellbore. This would allow timely removal of the crossover tool without disturbing the freshly placed gravel pack.

Breakers have been included in gravel pack slurries to decrease viscosity after placement of the gravel pack. U.S. Pat. No. 4,662,447 discloses a method wherein acid is mixed with a gravel slurry at the crossover tool. This method comprises spotting an acid solution in the annulus around the drill string, above a crossover tool. A pad of clean fluid follows the acid, followed by a gravel pack slurry. The crossover tool is provided with a mixing valve which permits annulus fluids to flow into the crossover tool and mix with fluids being pumped down the drill string. The mixing valve is provided with a check valve, allowing fluids to pass from the annulus into the crossover tool when the pressure in the annulus exceeds that in the crossover tool contents. The acid is mixed with the gravel packing slurry by applying pressure to the annulus as the gravel packing fluid is being forced into the wellbore through the crossover tool. With this method, the annulus cannot be used to return slurry carrier fluids. The slurry carrier fluids are disbursed into the formation. This method provides some control over the timing of the mixing of acid and slurry. But the rate of the mixing is difficult or impossible to control. The differential pressures between the annulus and the drill string content at the crossover tools vary depending upon many things that are not easily determined or controlled. It would also be preferable to utilize the annulus around the drill string to return slurry carrier fluids rather than to push these fluids into the formation.

A particularly useful polysaccharide for imparting viscosity to gravel pack slurries is succinoglycan. This polymer and its properties are disclosed in, for example, ACS Symposium Series 396 "Oil Field Chemistry—Enhanced Recovery and Production Simulation" by A. J. Clarke-Sturman, et al. Chapter 8, pp 157–168; "Succinoglycan: A New Biopolymer for the Oil Field" by A. J. Clarke-Sturman, et al. from Symposium on Advanced Oil Field Chemistry presented before the Division of Petroleum Chemistry, Inc. ACS, Toronto Meeting, Jun. 5-11, 1988; and European Patent Application 0,040,445. These polymers impart a high and relatively temperature insensitive viscosity to an aqueous composition below the polymers' transition temperature. As the transition temperature is exceeded, the viscosity imparted to an aqueous mixture by these polymers decreases markedly. The transition temperatures may be adjusted to a certain extent by addition of various modifiers, as disclosed in Great Britain Patent Application No. 902 6596.8 and the A. J. Clark-Sturman articles cited above.

These biopolymers also become much more susceptible to degradation by acid breakers at temperatures near the transition temperature. U.S. Pat. No. 4,754,809 discloses a method which utilizes the rapid acid degradation above the polymers transition temperature and the adjustment of the transition temperature to a temperature near the reservoir temperature. While the slurry is in the wellbore, it heats to the reservoir temperature and a rapid degradation then results. Such a method is disclosed as being useful for well completion and workovers along with stimulation, acidizing and enhanced oil recovery. But adjustment of the transition temperature is expensive and subject to change due to dilution by reservoir fluids. Adjustment of the transition temperature to the formation temperature and breaking of the carrier gel as it heats to the formation temperature results in a very unpredictable reduction of gel viscosity. The temperatures within the borehole may not relate to the formation temperature upon placement of the gravel pack, and may equilibrate to the formation temperature at widely varying rates due to cooling from fluids lost to the formation prior to gravel packing. Relying on the gel reaching a formation temperature therefore results in considerable uncertainty as to the time required for the gel to be broken.

It is, therefore, an object of this invention to provide a method to place a gravel pack in which sanding out of the solids does not occur prematurely, but yet results in rapid breaking of the polymer upon placement of the gravel pack within the wellbore. It is a further object to provide such a method which incorporates materials which will not be damaging to the formation. It is another object of the present invention to provide such a method wherein the gravel packing tool may be removed from the vicinity of the wellbore which is gravel packed within three hours of the placement of the gravel pack without disturbing the gravel pack. It is another object of the present invention to provide such a method which can be adjusted for accommodation of a variety of formation temperatures.

SUMMARY OF THE INVENTION

These and other objects accomplished by a process to gravel pack a portion of a wellbore within a formation comprising:
preparing a slurry comprising sand, water, and amount of succinoglycan biopolymer effective to maintain the sand in a stable suspension in the water, and an amount of a breaker effective to result in 80 percent settlement of sand from the slurry within one to three hours at a temperature that is about 20° F. less than the temperature of the formation;
inserting a gravel packing tool into the wellbore suspended from a drill pipe;
circulating the slurry through the drill pipe and the gravel packing tool to the portion of the wellbore to be gravel packed; and
allowing the sand to separate from the slurry in the portion of the wellbore to be gravel packed to form a gravel pack as the breaker breaks the succinoglycan biopolymer.

Most preferred breakers include hydrochloric acid and sodium perborate. The amount required can be easily determined by observing the amount of settlement of slurries with varying amounts of breaker after one to three hours. These breakers are preferred because they are known to not form a precipitate with succinoglycans in aqueous solutions. Other non-participate forming breakers are also preferred.

The transition temperature of the slurry is preferably modified if the formation temperature is greater than the transition temperature by more than about 10° F.

This modification of the transition temperature is preferably accomplished by addition of sodium chloride if modification of one to about 30° F. is desired. If more modification is desired, modification by addition of sodium or potassium formate is preferred due to its increased effectiveness at moderate concentrations.

DETAILED DESCRIPTION OF THE INVENTION

Placement of sand around a production well liner to prevent formation sand from penetration to the well liner involves suspension of the well liner from a crossover tool and drill string within the wellbore. The crossover tool provides communication from the inside of the drill string to the wellbore surrounding the well liner. The crossover tool also typically provides communication for return fluid from within the liner to the annulus surrounding the drill pipe. The wellbore above the crossover tool surrounding the drill pipe and the wellbore surrounding the liner below the crossover tool are typically separated by a packer associated with the crossover tool.

After the liner is suspended in the wellbore within the portion of the wellbore which is to be packed, a slurry of sand of a carefully selected size is pumped through the drill pipe, crossover and into the annulus surrounding the liner. Typically, 1 to 20 pounds of sand are suspended in each gallon of carrier fluid. The liner contains slots which are sufficiently narrow to prevent passage of this sand to within the liner. The fluid carrier can pass into the liner through the slots and then pass through the crossover tool to the annulus surrounding the drill pipe. After this sand is placed around the liner, the sand is allowed to settle for two to six hours. The crossover tool is then disconnected from the liner and lifted out of the wellbore. A production tubing is then placed in the wellbore and connected to the liner.

The slurry containing the sand must be viscous enough to suspend the sand and prevent the sand from "sanding out", or dropping from the slurry prematurely. This viscosity is preferably very shear-thinning and insensitive to variations in the temperature. Shear-thinning results in the slurry being pumpable in spite of being sufficiently viscous to maintain sand particles in suspension. Insensitivity to changes in temperature prevents sanding out due to the slurry increasing in temperature as the slurry passes through the drill pipe.

Succinoglycan is a biopolymer capable of imparting these useful properties to sand slurries. Succinoglycan solutions display viscosities which are, below their transition temperatures, much more temperature insensitive than other polymers. They are additionally more shear-thinning than polymers commonly used as viscosifier.

Succinoglycan is a heteropolysaccharide comprising glucose and, for each 7 moles of glucose, 0.9 to 1.2 moles of galactose and 0.65 to 1.1 moles of pyruvate, together with succinate and acetate in molar proportions (for each 7 moles of glucose) between 0 and 2.

Heteropolysaccaharides of this type are generated by a variety of micro-organisms, including those of the genera Pseudomonas, Rhizobium, Alcaligenes and Agrobacterium. Particularly suitable organisms include *Rhizobium meliloti, Alcaligenes faecalis* var. *myxogenes, Agrobacterium tumefaciens, Agrobacterium radiobacter, Agrobacterium rhizogenes,* and Pseudomonas sp.NCIB 11264, and also a strain of Pseudomonas species isolated from a sample of soil, and deposited at the National Collection of Industrial Bacteria, Torry Research Station, Aberdeen, under the accession number 11592.

The heteropolysaccharide used in the process of this invention can be produced by cultivating the chosen microorganism in an aqueous nutrient medium until substantial quantities of heteropolysaccharide are elaborated. The aqueous nutrient medium will normally contain an assimilable source of carbon and nitrogen, together with smaller amounts of magnesium, calcium, iron, phosphorus and other inorganic ions. The sources of nitrogen and carbon are suitably an ammonium salt and a carbohydrate, respectively, the latter conveniently being glucose, and preferably being employed in a concentration between 0.1 and 10% by weight, normally 1-2% w/v. The temperature of cultivation and time required to generate an acceptable yield of heteropolysaccharide naturally vary according to the organism. In the case of Pseudomonas sp.NCIB 11592 the temperature is preferably between 20° and 35° C., and for a batch process the fermentation time is normally between 60-180 hours, generally from 80-100 hours.

When the fermentation is completed, the heteropolysaccharide may be recovered from the neat fermentation broth, or, more preferably, after the broth has been separated from the cells. This separation is conveniently carried out by adding a suitable diluent to give a concentration of polysaccharide of about 2000 ppm, and centrifuging the cells from the diluted broth. The clarified broth may then be treated by known techniques to recover the heteropolysaccharide from the fermentation broth. A convenient technique is that of solvent precipitation, in which the clarified fermentation broth is treated with a suitable inorganic salt, such as potassium chloride, and a water miscible solvent which does not react with the heteropolysaccharide and in which the product is insoluble. The product is thus precipitated and may be recovered by accepted and known techniques and dried. Typical organic solvents which may be used are straight or branched chain lower alkanols, e.g. methanol, ethanol, and isopropanol. The preferred solvent is isopropanol. The volume added is normally about 1.5 times the volume of clarified fermentation beer.

It is not always essential to separate out the pure heteropolysaccharide, and a convenient process variant is to establish a steady state fermentation in which nutrient medium is continuously fed to the micro-organism, polysaccharide-containing nutrient medium is continuously withdrawn from the system and, after any necessary clarification, concentration adjustment and/or incorporation of additional compounds, may be utilized in the process of the present invention.

It is believed that the heteropolysaccharide used in the process of this invention effectively comprises an octasaccharide repeating unit based on 7 D-glucose residues and 1 D-galactose residue. The heteropolysaccharide also contains varying proportions of certain acid residues, namely pyruvate, succinate and acetate. The precise proportions of these molecular components vary according to the micro-organism from which the heteropolysaccharide is produced, and also the precise conditions under which the organism is cultivated. Also the proportions as determined experimentally will show some degree of variability between successive sets of measurements on the same material, arising in part from a lack of complete homogeneity in the material and hence a real variation between samples, and in part from the limits of accuracy of the analytical techniques employed. Pyruvate is always present in the heteropolysaccharide, but acetate and succinate may occur only in small amounts or not at all. Treatment of the polysaccharide with alkali will remove any succinate and acetate originally present, but it will leave the pyruvate intact. Such a polysaccharide, wherein the acetate and succinate content is effectively zero, has acceptable physical/rheological properties and falls within the scope of this invention.

Before these succinoglycans is utilized in the present invention, purification to remove residues of the fermentation process is preferred. A preferred method to purify those succinoglycans is taught in European Patent Application Publication No. A2 018959, incorporated herein by reference. This process comprises aerobically fermenting an assimilable carbohydrate source with a polysaccharide producing microorganisms of the succinoglycan type in an aqueous nutrient medium characterized by adding cellulose to the fermentation broth. Succinoglycans purified by this method are exceptionally clean and can be used in gravel pack slurries without impairing permeability of the formation in the vicinity of the wellbore.

Succinoglycan solutions exhibit a stable viscosity with increasing temperature to near a transition temperature. At the transition temperature, the viscosity of the solution decreases almost to that of water.

A particularly preferred commercially available succinoglycan is Shellflo-S, available from Shell International Chemical Company Limited, Ref. CSAS/12/21, Shell Centre, London SE1 7PG, England. This succinoglycan is relatively free of solids and is supplied as a prehydrated liquid. Slurry preparation of a job site is significantly simplified by the use of a prehydrated liquid viscosifier.

It is known that the transition temperature of succinoglycan solutions may be varied by including modifiers in the solution. For example, FIG. 7 of Chapter 8 by Clark-Sturman, et al., *Oilfield Chemistry*, ACS Symposium Series 396, edited by Borchardt and Yen, 1988, discloses the transition temperature of a succinoglycan solution at various concentrations of five modifiers. Calcium bromide is particularly effective at lowering the transition temperature, and potassium formate and sodium chloride are particularly effective at raising the transition temperature.

In the gravel packing process of the present invention, lowering the transition temperature when the formation temperature is lower than the unmodified transition temperature (of about 156° F. in 3% $NH_4Cl$) is not preferred. The transition temperature, however, must be increased when the formation temperature exceeds the transition temperature by more than about 10° F. Applicant has found that addition of an increased amount of breaker will be generally less expensive, and will result in a more consistent and predictable viscosity reduction than adjustment of the solution's transition temperature when the transition temperature is more than 10° F. below the formation temperature.

Sodium chloride is a preferred modifier for raising the transition temperature of the solution by about 30° F. or less. Sodium or potassium formate is preferred as a modifier for increasing the transition temperature by more than 30° F. A solution of succinoglycan containing 50% by weight of sodium formate has a transition temperature of about 247° F. Inclusion of a formate is also preferred because of a beneficial effect on the solution shear stability as disclosed in U.S. Pat. No. 4,900,457.

Breakers known in the art as useful for reducing viscosity of polymeric thickeners are useful as the breakers of the present invention. Hydrochloric acid and a salt of a perborate are preferred due to excellent results from use of these breakers with succinoglycan systems. The salt of a perborate is preferably a sodium perborate in either an anhydrous, monohydrate or tetranhydrate form. Other breakers could be used, and the amount of breaker required could be determined by routine experimentation according to criteria that the sand of a slurry must be 80% settled after a time of one to three hours with the beaker. This is a simple test performed by mixing slurry, polymer and breaker in a breaker, heating the slurry to the desired temperature, and observing the location of the slurry-clear solution interface after one hour, three hours, and after the sand has settled for a long period of time. As sand settles from the slurry, an interface between clear liquid and sand containing slurry will become evident. After a long time period, this interface will reach as an "ultimate interface level" below which it will not settle. The "percent settled" is the percent of the distance the interface has moved from the initial interface (top of the initial slurry) to the ultimate interface level. The amount of breaker in the composition must result in the slurry being less than 80 percent settled after one hour and more than 80 percent settled after three hours.

Some formations, in particular carbonate formations and formations containing particular clays, are easily damaged by contact with acids. In these formations, perborate or other oxidative breakers are preferred.

The breaker is preferably one which does not cause succinoglycan to precipitate from an aqueous solution. Although prediction of precipitation is difficult, determining whether a breaker causes precipitation is easily determined. Addition of an effective amount of breaker to a succinoglycan solution will result in the solution turning cloudy if a precipite is formed. Ammonium persulfate and lithium hypochlorite are commonly used polymer breakers which forms such a precipitate. A succinoglycan precipitate could block pores within the formation and reduce formation permeability in the vicinity of the wellbore. A preferred breaker is therefore a non-formation damaging breaker.

Perborate salts may be useful as a breaker in anhydrous, tetrahydrate, or monohydrate forms. Sodium salts such as sodium perborate tetrahydrate are preferred due to commercial availability, but other metal salts are equally effective.

Preparation of the gravel pack slurry can be accomplished according to normal slurry preparation procedures, but it is preferred that high shear mixing not be utilized after breaker is added to the slurry. The breaker is preferably added just prior to injection into the wellbore to prevent viscosity decreasing prematurely.

In a preferred embodiment, the gravel packing slurry further comprises an amount of a chelating agent which is effective to prevent multivalent ions from affecting the succinoglycan. Citric acid is an acceptable chelating agent and is preferred due to its availability and low cost. A concentration of about one quarter of a pound of citric acid per barrel in the slurry is typically effective to prevent minor amounts of multivalent ions from affecting the succinoglycan.

The amount of succinoglycan required depends upon such factors as the size of sand which is to be suspended, the length of time the sand is to remain in suspension and the temperature during the mixing and packing operation. A more significant variable is the type and quality of the succinoglycan. Succinoglycan is commercially available as a prehydrated 7 to 8 percent active succinoglycan in an aqueous solution. Typically, between about 0.025 and 5% by weight of active succinoglycan is used in the slurry, and between about 0.04 and about 0.5% by weight is preferred. Concentrations of slurry components referred to herein are based on the carrier fluid without the sand.

Although the amount and type of breaker can be varied, and the amount of any particular type of breaker required can be determined by a simple settling test, Applicant has determined various acceptable recipes which a function of formation temperature. These recipes all include about 0.43% by weight of Shellflo-S succinoglycan biopolymer, about 0.0713% w/v citric acid, a salt to either modify the transition temperature of the succinoglycan or to protect the wellbore from clay swelling and a breaker. The breaker is either hydrochloric acid or sodium perborate tetrahydrate (Na-BO$_3$.4H$_2$O) as indicated in Table 1. Table 1 lists the recipes which have been determined to be useful as a function of temperature, along with the resultant slurry transition temperature, Tm.

TABLE 1

| FORMATION TEMP. °F. | SALT | Tm, °F. | | BREAKER |
|---|---|---|---|---|
| 95 | 3.0% NH$_4$Cl | 156 | | 2.5 lb/bbl NaBO$_3$.4H$_2$O |
| 100 | 3.0% NH$_4$Cl | 156 | | 2.3 lb/bbl NaBO$_3$.4H$_2$O |
| 115 | 3.0% NH$_4$Cl | 156 | | 1.5 lb/bbl NaBO$_3$.4H$_2$O |
| 120 | 3.0% NH$_4$Cl | 156 | | 1.3 lb/bbl NaBO$_3$.4H$_2$O |
| 125 | 3.0% NH$_4$Cl | 156 | | 1.0 lb/bbl NaBO$_3$.4H$_2$O |
| 130 | 3.0% NH$_4$Cl | 156 | | .75 lb/bbl NaBO$_3$.4H$_2$O |
| 135 | 3.0% NH$_4$Cl | 156 | | .60 lb/bbl NaBO$_3$.4H$_2$O |
| 146 | 3.0% NH4Cl | 156 | .25M HCl or | ¼ lb/bbl NaBO$_3$.4H$_2$O |
| 150 | 3.0% NH4Cl | 156 | .25M HCl or | ¼ lb/bbl NaBO$_3$.4H$_2$O |
| 161 | 3.0% NH4Cl | 156 | .25M HCl or | ¼ lb/bbl NaBO$_3$.4H$_2$O |
| 166 | 3.0% NH4Cl | 156 | .25M HCl or | ¼ lb/bbl NaBO$_3$.4H$_2$O |
| 170 | 6.0% NH4Cl | 160 | .25M HCl or | ¼ lb/bbl NaBO$_3$.4H$_2$O |
| 176 | 10.7% NaCl | 166 | .25M HCl or | ¼ lb/bbl NaBO$_3$.4H$_2$O |
| 180 | 13.0% NaCl | 170 | .25M HCl or | ¼ lb/bbl NaBO$_3$.4H$_2$O |
| 196 | 26.0% NaCl | 186 | .25M HCl or | ¼ lb/bbl NaBO$_3$.4H$_2$O |
| 200 | 21.0% NaCOOH | 190 | | ¼ lb/bbl NaBO$_3$.4H$_2$O |
| 210 | 26.5% NaCOOH | 200 | | ¼ lb/bbl NaBO$_3$.4H$_2$O |
| 220 | 31.5% NaCOOH | 210 | | ¼ lb/bbl NaBO$_3$.4H$_2$O |
| 230 | 36.5% NaCOOH | 220 | | ¼ lb/bbl NaBO$_3$.4H$_2$O |
| 240 | 41.5% NaCOOH | 230 | | ¼ lb/bbl NaBO$_3$.4H$_2$O |
| 257 | 50.0% NaCOOH | 247 | | ¼ lb/bbl NaBO$_3$.4H$_2$O |

Compositions similar to those described in Table 1 have been found to suspend gravel packing sands, and between one and three hours, result in 80% settlement of the sand.

Gravel packing of a deviated well using succinoglycan as a thickener was attempted using an amount of sodium perborate tetrahydrate breaker which exceeded the amount which resulted in 80% settlement of the sand within one hour at a temperature of 20° F. less than the formation temperature. The slurry was also recirculated through a centrifugal pump after addition of the breaker, also contributing to a premature viscosity loss. This gravel packing attempt was unsuccessful due to the slurry "sanding out". The sand dropped from suspension prior to placement in the portion of the well which is to be packed.

The foregoing description of the invention is merely intended to be explanatory thereof, and various changes in the details of the described method and apparatus may be made within the scope of the appended claims without departing from the spirit of the invention.

I claim:

1. A process to gravel pack a portion of a wellbore within a formation comprising:
   preparing a slurry comprising sand, water, and amount of succinoglycan biopolymer effective to maintain the sand in a stable suspension in the water, and an amount of a breaker effective to result in 80 percent settlement of sand from the slurry within one to three hours at a temperature that is about 20° F. less than the temperature of the formation;
   inserting a gravel packing tool into the wellbore suspended from a drill pipe;
   circulating the slurry through the drill pipe and the gravel packing tool to the portion of the wellbore to be gravel packed; and
   allowing the sand to separate from the slurry in the portion of the wellbore to be gravel packed to form a gravel pack as the breaker breaks the succinoglycan biopolymer.

2. The process of claim 1 wherein the sand is allowed to separate from the water for a time period of two to six hours.

3. The process of claim 1 wherein the breaker is hydrochloric acid.

4. The process of claim 1 wherein the breaker is an oxidative breaker.

5. The process of claim 4 wherein the breaker is a salt of a perborate.

6. The process of claim 1 wherein the temperature of the formation exceeds the unmodified transition temperature of the succinoglycan biopolymer by more than about 10° F. and the slurry further comprises an amount of sodium formate effective to raise the transition temperature of the succinoglycan to within 10° F. of the temperature of the formation.

7. The process of claim 1 wherein the formation temperature is about 95° F. and the breaker consists of sodium perborate at a concentration equivalent to about 2.5 lbs. of sodium perborate tetrahydrate per barrel of slurry.

8. The process of claim 1 wherein the formation temperature is about 100° F. and the breaker consists of sodium perborate at a concentration equivalent to about 2.3 lbs. of sodium perborate tetrahydrate per barrel of slurry.

9. The process of claim 1 wherein the formation temperature is about 115° F. and the breaker is sodium perborate at a concentration equivalent to about 1.5 lbs. of sodium perborate tetrahydrate per barrel of slurry.

10. The process of claim 1 wherein the formation temperature is about 120° F., the breaker is sodium perborate at a concentration equivalent to about 1.3 lbs. of sodium perborate tetrahydrate per barrel of slurry.

11. The process of claim 1 wherein the formation temperature is about 125° F., the breaker is sodium perborate at a concentration equivalent to about 1 lbs. of sodium perborate tetrahydrate per barrel of slurry.

12. The process of claim 1 wherein the formation temperature is about 130° F., the breaker consists of sodium perborate at a concentration equivalent to about $\frac{3}{4}$ lbs. sodium perborate tetrahydrate per barrel of slurry.

13. The process of claim 1 wherein the formation temperature is about 135° F. and the breaker consists of sodium perborate at a concentration equivalent to about 0.6 lbs. sodium perborate tetrahydrate per barrel of slurry.

14. The process of claim 1 wherein the formation temperature is between about 146° F. and about 166° F., and the the breaker is selected from the group comprising perborate in a concentration equivalent to about $\frac{1}{8}$ lbs. sodium perborate tetrahydrate per barrel of the slurry and hydrochloric acid in a concentration of about $\frac{1}{4}$ molar.

15. The process of claim 1 wherein the formation temperature is between about 170° F. and about 200° F., the transition temperature of the succinoglycan is modified by inclusion in the slurry of sodium chloride in a concentration effective to raise the transition temperature of the succinoglycan to a temperature which is about 10° F. less than the formation temperature, and the breaker is selected from the group consisting of hydrogen chloride in a concentration of about $\frac{1}{4}$ molar and perborate in a concentration equivalent to about $\frac{1}{8}$ lbs. of sodium perborate tetrahydrate per barrel of the slurry.

16. The process of claim 1 wherein the formation temperature is between about, 200° F. and about 267° F., the transition temperature of the succinoglycan is modified by inclusion in the slurry of sodium formate in a concentration effective to raise the transition temperature of the succinoglycan to a temperature which is about 10° F. less than the formation temperature and the breaker consists of perborate at a concentration equivalent to about $\frac{1}{8}$ lbs. of sodium perborate tetrahydrate per barrel of slurry.

17. The process of claim 1 wherein the breaker is a non-formation damaging breaker.

* * * * *